(12) United States Patent
Scharr et al.

(10) Patent No.: US 10,309,507 B2
(45) Date of Patent: Jun. 4, 2019

(54) TRANSMISSION ARRANGEMENT

(71) Applicant: ZF Friedrichshafen AG, Friedrichshafen (DE)

(72) Inventors: Stephan Scharr, Friedrichshafen (DE); Alexander Dusdal, Ellwangen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 30 days.

(21) Appl. No.: 15/517,551

(22) PCT Filed: Sep. 30, 2015

(86) PCT No.: PCT/EP2015/072524
§ 371 (c)(1),
(2) Date: Apr. 7, 2017

(87) PCT Pub. No.: WO2016/055322
PCT Pub. Date: Apr. 14, 2016

(65) Prior Publication Data
US 2017/0307055 A1      Oct. 26, 2017

(30) Foreign Application Priority Data

Oct. 8, 2014   (DE) .................. 10 2014 220 347

(51) Int. Cl.
*B60K 1/00*       (2006.01)
*B60K 17/04*      (2006.01)
(Continued)

(52) U.S. Cl.
CPC ............ *F16H 37/082* (2013.01); *B60K 1/00* (2013.01); *B60K 17/046* (2013.01); *B60K 17/16* (2013.01);
(Continued)

(58) Field of Classification Search
CPC .......... F16H 37/082; F16H 48/08; F16H 3/66; F16H 48/40; F16H 48/05; F16H 48/10;
(Continued)

(56) References Cited

U.S. PATENT DOCUMENTS 4,418,777 A * 12/1983 Stockton ............. F16H 57/0413
180/65.6
4,479,404 A   10/1984 Stockton
(Continued)

FOREIGN PATENT DOCUMENTS

DE        20213669 U1    2/2004
DE     102009006523 A1   8/2010
(Continued)

OTHER PUBLICATIONS

"Introduction to Gears"; Kohara Gear Industry Co.,Ltd.; Nov. 1, 2006; First Edition; p. 12.*
(Continued)

*Primary Examiner* — Jacob S. Scott
*Assistant Examiner* — James J Taylor, II
(74) *Attorney, Agent, or Firm* — Dority & Manning, P.A.

(57) ABSTRACT

A transmission (GA) for an axle drive (1) of a motor vehicle includes a drive shaft (AN), two output shafts (AB1, AB2), at least four shafts (W1, W2, W3, W4), a differential, and two interconnected planetary gear sets (PS1, PS2). The drive shaft (AN) is a hollow shaft, and the drive shaft (AN) is coaxial with at least one of the two output shafts (AB1, AB2). The differential (D) is arranged, at least partly, within a cylindrical volume. An outer shell surface of the cylindrical volume is defined by an inner shell surface of a sun gear (SO2) of the second planetary gear set (PS2). A diameter of inner shell surface corresponds to an inner diameter of the sun gear (SO2) of the second planetary gear set (PS2).

14 Claims, 4 Drawing Sheets

(51) Int. Cl.
*B60K 17/16* (2006.01)
*F16H 37/08* (2006.01)
*F16H 48/08* (2006.01)
*F16H 48/40* (2012.01)

(52) U.S. Cl.
CPC ............. *F16H 48/08* (2013.01); *F16H 48/40* (2013.01); *B60K 2001/001* (2013.01)

(58) Field of Classification Search
CPC .............. F16H 48/11; F16H 2048/104; F16H 2048/106; F16H 2048/108; B60K 17/046; B60K 17/16; B60K 17/08; B60K 1/00; B60K 2001/001; B60K 17/043
See application file for complete search history.

(56) References Cited

U.S. PATENT DOCUMENTS

| | | | |
|---|---|---|---|
| 4,799,158 A * | 1/1989 | Patil | F16H 61/0437 477/154 |
| 5,845,732 A | 12/1998 | Taniguchi et al. | |
| 6,074,321 A * | 6/2000 | Maeda | B60K 1/00 475/221 |
| 7,247,117 B2 * | 7/2007 | Forster | B60K 17/046 180/65.6 |
| 7,351,178 B2 | 4/2008 | Keuth | |
| 7,384,357 B2 * | 6/2008 | Thomas | B60K 17/356 180/247 |
| 7,497,286 B2 * | 3/2009 | Keller | B60K 6/48 180/65.6 |
| 8,336,655 B2 | 12/2012 | Knoblauch | |
| 8,777,796 B2 | 7/2014 | Petersen et al. | |
| 8,876,643 B2 | 11/2014 | Fickel et al. | |
| 8,974,341 B2 | 3/2015 | Smetana et al. | |
| 9,566,857 B1 * | 2/2017 | Pritchard | B60K 6/50 |
| 9,950,607 B2 * | 4/2018 | Littlefield | B60K 6/365 |
| 10,065,489 B2 * | 9/2018 | Wang | B60K 1/00 |
| 2007/0093344 A1 * | 4/2007 | Kira | B60K 6/36 475/150 |
| 2009/0111641 A1 * | 4/2009 | Kim | B60K 6/36 477/5 |
| 2009/0197727 A1 * | 8/2009 | Janson | B60K 6/365 475/5 |
| 2012/0031691 A1 * | 2/2012 | Fuechtner | B60K 1/00 180/65.6 |
| 2018/0076687 A1 * | 3/2018 | Pritchard | H02K 11/33 |

FOREIGN PATENT DOCUMENTS

| | | |
|---|---|---|
| DE | 102010004228 A1 | 7/2011 |
| DE | 102010024580 A1 | 12/2011 |
| DE | 102010050217 A1 | 5/2012 |
| DE | 102010054533 A1 | 6/2012 |
| DE | 102011007260 A1 | 10/2012 |
| DE | 102011007455 A1 | 10/2012 |
| DE | 102012009346 A1 | 11/2013 |

OTHER PUBLICATIONS

German Search Report DE102014220347.3, dated Feb. 23, 2016. (8 pages).
International Search Report (English Translation) PCT/EP2015/072524, dated Nov. 23, 2015. (4 pages).

* cited by examiner

TRANSMISSION ARRANGEMENT

FIELD OF THE INVENTION

The present invention relates generally to a transmission arrangement for an axle drive arrangement of a motor vehicle.

BACKGROUND

In the development of transmission arrangements, finding particularly space-efficient and compact transmission arrangements (and thus also compact drive arrangements) that can be used in a wide variety of vehicle types, is of interest. Particularly in the case of small or compact vehicles, the available free volume of which within the engine compartment is very limited, an arrangement that occupies as little installation space as possible is desirable.

DE 102009006523 A1 discloses an electric axle arrangement for a motor vehicle, which features two electric motors. The first electric motor is connected in a torque-proof manner to a first input shaft; the second electric motor is connected to a second input shaft. The first and second input shafts are coaxial. Furthermore, a first output shaft, which is connected to a first drive wheel, is coaxial with a second output shaft, which is connected to a second drive wheel. The output shafts are respectively connected to the input shafts by at least one transmission stage. Thus, the drive wheels can be driven independently of each other.

An electrical axle for a motor vehicle is known from DE 102010050217 A1; this features an electric motor with a stator and a rotor, a transmission having at least two transmission ratios and one housing. Thereby, the input element of the transmission is connected to the rotor, and the output element of the transmission is connected to a differential, which distributes the drive power to two output shafts. The transmission is formed by a planetary gear set, whereas a ring gear of the planetary gear set can be connected to the housing by a first clutch, and a planetary carrier of the planetary gear set can be connected to the ring gear by a second clutch. The planetary carrier is connected to the planetary carrier shaft, which is rotatable mounted coaxially within the ring gear shaft.

SUMMARY OF THE INVENTION

Example aspects of the invention provide a transmission arrangement and an axle drive arrangement of the aforementioned type featuring an axially compact design and having a drive shaft that can be connected to a drive source, the drive shaft being coaxial to an output shaft. For this purpose, the individual structural elements of the transmission arrangement (for example, planetary gear sets, elements of the planetary gear sets and the differential) and the elements of the axle drive arrangement (for example, a drive source, bearings and a housing) are arranged relative to each other in such a manner that the required installation space for the entire transmission arrangement and for the entire axle drive arrangement is kept as low as possible. The transmission arrangement, and thus the axle drive arrangement, are also to be realized in a cost-effective manner.

The transmission arrangement for an axle drive arrangement of a motor vehicle includes a drive shaft, two output shafts, at least four additional shafts, a differential, and two interconnected planetary gear sets, of which the first planetary gear set features a sun gear, a planetary carrier and a ring gear, and the second planetary gear set features a sun gear, a planetary carrier and a ring gear, whereas the drive shaft is formed as a hollow shaft, and the drive shaft is coaxial with at least one of the output shafts.

The transmission arrangement features a drive shaft, two output shafts and at least four additional shafts. A shaft is not to be understood solely as, for example, a cylindrical, rotatable mounted machine element for transferring torque; rather, it also includes general connecting elements that connect individual structural elements with each other, along with connecting elements that connect multiple structural elements in a torque-proof manner. Thereby, a structural element is a component of the transmission arrangement, for example planetary gear sets, elements of planetary gear sets, differentials and shifting elements.

The drive shaft connects the transmission arrangement and a drive source, and serves the purpose of transferring a torque provided by the drive source into such transmission arrangement. The drive source can be connected directly to the drive shaft by its drive shaft connection interface. Alternatively, the drive source can be connected to the driveshaft connection interface by a shifting element. In accordance with example aspects of the invention, the drive shaft is formed as a hollow shaft; i.e., the drive shaft features such a recess around its longitudinal axis of rotation that can enclose one or more additional shafts. This axis of rotation is also the center axis of the entire transmission arrangement and likewise the center axis of the axle drive arrangement.

The output shaft, on the other hand, transfers the torque that has been converted by the transmission arrangement out of the transmission arrangement, and thereby features a rotational speed that has been modified by the transmission arrangement. The output shaft can be connected through its output shaft connection interface to other structural elements, such as a shaft, a clutch or chassis elements, such that the converted torque can be transferred to such other structural elements. The transmission arrangement in accordance with example aspects of the invention features two output shafts, of which at least one output shaft is arranged partly within the drive shaft (i.e., enclosed by the drive shaft that is formed as a hollow shaft), such that the output shaft connection interface of this one output shaft protrudes from the drive shaft.

The individual structural elements of the transmission arrangement and the axle drive arrangement, for which the transmission arrangement can be used, are arranged along the axis of rotation of the drive shaft (that is, the center axis), and are located either closer to the output shaft connection interface of the first output shaft or closer to the output shaft connection interface of the second output shaft. The structural elements can be positioned radially close to the center axis or at a defined radial distance from the center axis. Both output shafts are connected to the differential. A differential is thereby defined as a transfer gearbox that transmits drive power provided by the drive source to the two output shafts. The differential can be formed, for example, as a bevel gear differential, as a spur gear differential or as a transverse shaft differential.

Two structural elements are designated as connected if there is a fixed connection between the structural elements, for example a torque-proof connection. Structural elements of this type rotate with the same rotational speed. Two structural elements are, in turn, referred to as connectable if there is a selectively detachable torque-proof connection between such structural elements. Such structural elements rotate at the same rotational speed if the connection is established. Thereby, the various structural elements can be connected to each other through a shaft or a shifting element, but also directly, for example, by a welded connection, a crimping connection or another connection. A shifting element is thereby defined as a shiftable connection between two structural elements, whereas the torque to be transferred between such two structural elements is transferred by a frictional connection, for example with multi-disk couplings, multi-disk brakes, band brakes, cone couplings, cone brakes, or by positively locking connection, for example with dog clutches, dog brakes or toothed couplings.

Furthermore, the transmission arrangement features a first and a second planetary gear set, which are connected to each other and form a transmission. A planetary gear set is defined as a negative planetary transmission with exactly one planetary carrier, to which a number of planetary gears are rotatable mounted, with exactly one sun gear and with exactly one ring gear. The planetary carrier thereby carries the planetary gears of the planetary transmission, which mesh with both the sun gear and the ring gear of the planetary transmission.

The proposed transmission arrangement is characterized in that the differential is arranged, at least in partly, within a cylindrical volume, the outer shell surface of which is limited by an inner shell surface of the sun gear of the second planetary gear set, the diameter of which corresponds to an inner diameter of the sun gear of the second planetary gear set.

The sun gear of the second planetary gear set is suitable for accommodating transmission structural elements in shape and size, whereas the cylindrical volume features the form of a straight circular cylinder. Thus, the sun gear of the second planetary gear set features a recess in the form of the straight circular cylinder, which is arranged around an axis of rotation of the sun gear of the second planetary gear set, and is usable as installation space and is material-free. The diameter of such recess is the inner diameter of the sun gear of the second planetary gear set. The shell surface of the cylindrical recess (that is, the inner shell surface of the sun gear of the second planetary gear set) corresponds to the shell surface of the cylindrical volume enclosed by the sun gear of the second planetary gear set. The cover surfaces of such cylindrical volume are arranged in the same plane as the cover surfaces of the sun gear of the second planetary gear set. Since the differential features a larger axial length than the second planetary gear set, the differential is arranged at least partly within the second cylindrical volume. In other words, the sun gear of the second planetary gear set encloses the differential, by which the overall axial length of the transmission arrangement is significantly reduced, in contrast to a structure with which the differential is arranged in a manner axially adjacent to the planetary gear sets.

According to a first example embodiment of the transmission arrangement, the planetary carrier of the first planetary gear set is in operative connection with the sun gear of the second planetary gear set by a first shaft. The first shaft connects the sun gear of the second planetary gear set directly to the planetary carrier of the first planetary gear set, such that a direct transfer of torque takes place and both elements feature the same rotational speed.

According to an additional example embodiment of the transmission arrangement, the planetary carrier of the second planetary gear set is in operative connection with the differential by a fourth shaft. The fourth shaft connects the planetary carrier of the second planetary gear set directly to an input element of the differential, such that a direct transfer of torque takes place, and both elements feature the same rotational speed. Depending on the differentials design, the input element of the differential is, for example, a differential cage, a differential bar, a differential bolt or a differential rod, and transfers the input torque and the input rotational speed into the differential for the purposes of modifying torque and rotational speed of the output shafts.

According to an additional example embodiment of the transmission arrangement, the ring gear of the first planetary gear set is non-rotatably fixed by a second shaft, and the ring gear of the second planetary gear set is non-rotatably fixed by a third shaft. Both the ring gear of the first planetary gear set and the ring gear of the second planetary gear set can be connected to a housing enclosing the axle drive arrangement for which the transmission arrangement can be used.

According to an additional example embodiment of the transmission arrangement, the first planetary gear set and the second planetary gear set feature the same modules, and the ring gear of the first planetary gear set and the ring gear of the second planetary gear set are designed as a single component. That is, the sun gear, the ring gear and the planetary gears supported by the planetary carrier of the first planetary gear set each feature the same module as the sun gear, the ring gear and planetary gears of the second planetary gear set supported by the planetary carrier. This necessitates a cost-effective realization of the transmission arrangement.

According to an additional example embodiment of the transmission arrangement, the differential is a two-element bevel gear differential, the differential cage of which is formed from two elements, a first differential cage element and a second differential cage element connectable to the first differential cage element. The two-element bevel gear differential is axially mountable on the axis of rotation of the drive shaft, i.e. the center axis.

The two-element bevel gear differential features a two-part differential cage. The first differential cage element is cup-shaped, and the second differential cage element is formed as a lid. The cup-shaped first differential cage element features a receptacle for the second differential cage element in the axial direction, such that these two differential cage elements can be connected to each other. This connection is preferably effected by a screw connection. The connecting positions are selected according to the axial forces arising at the differential.

Within the cup-shaped first differential cage element, all structural elements of the two-element bevel gear differential are arranged as in the case of a commercially available bevel gear differential. Such structural elements are, for example, two compensating wheels, two bevel wheels, one differential bolt, one alignment pin and multiple compensating disks. In contrast to a commercially available bevel gear differential, the assembly of the structural elements is performed in the axial direction starting from the axis of rotation of the drive shaft, that is, the center axis of the transmission arrangement and thus also of the axle drive arrangement. In other words, the assembly direction is along the axis of rotation of the two output shafts that are connected to the differential. The axial assembly direction has the advantage that the bearing system of the differential no longer has to be carried out in the axial direction by an engaged bearing system. Thereby, overall dimensions can be reduced compared to a commercially available bevel gear differential, which is typically used in the transmission arrangement. That is, the overall length of the transmission arrangement is reduced by the use of the two-element bevel gear differential in comparison to the use of a commercially available bevel gear differential.

According to an additional example embodiment of the transmission arrangement, the differential is supported by a fixed-floating bearing arrangement having a fixed bearing and a floating bearing. Contrary to the customarily engaged bearing arrangement of a differential featuring bearings axially directly adjacent to the differential, both the fixed bearing and the floating bearing are arranged radially offset from the axis of rotation of the drive shaft and not in a manner axially directly adjacent to the differential. This has the advantage that the axial dimension of the transmission arrangement is shorter compared to an engaged bearing system of the differential. Thus, the required installation space for the entire axle drive arrangement is more compact.

According to an additional example embodiment of the transmission arrangement, the fixed bearing is positioned on the first differential cage element between a housing and the first differential cage element, the housing almost completely enclosing the axle drive arrangement. The floating bearing is guided on the housing by the planetary carrier of the second planetary gear set. The housing encloses the axle drive arrangement almost completely; that is, the housing is formed in such a manner that the output shaft connection interface of the first output shaft and the output shaft connection interface of the second output shaft protrude from the housing.

The fixed bearing and the floating bearing are arranged in a manner radially offset from the axis of rotation of the drive shaft. Here, an arrangement with a radial offset from the axis of rotation of the drive shaft is the arrangement of a structural element at a radial distance from the center axis of the transmission arrangement and also of the axle drive arrangement. In this case, the fixed bearing is directly connected to the first differential cage element of the differential and the housing of the axle drive arrangement, and is directly radially adjacent to the differential. The floating bearing is directly connected to the housing of the axle drive arrangement and directly connected to the planetary carrier of the second planetary gear set. By positioning the bearings with a radial offset to the differential, the total required installation space of the axle drive arrangement using the transmission arrangement is more compact compared to an engaged bearing system of the differential or compared to a fixed floating bearing system having an axial offset to the differential.

According to a first example embodiment of an axle drive arrangement featuring one of the transmission arrangements described in the preceding description, the transmission arrangement is in operative connection with a drive source. A drive source is defined here, for example, as an electric motor, a hydromotor, an internal combustion engine or as any other drive source that is suitable for providing energy for driving a motor vehicle. Thereby, the transmission arrangement can be in operative connection with the drive source through the drive shaft connection interface of its drive shaft.

According to an additional example embodiment of the axle drive arrangement featuring one of the transmission arrangements described in the preceding description, the drive shaft is in operatively connecting the sun gear of the first planetary gear set with the drive source. The torque and rotational speed provided by the drive source are transferred to the sun gear of the first planetary gear set.

According to an additional example embodiment of the axle drive arrangement featuring one of the transmission arrangements described in the preceding description, a shifting element is arranged between the drive source and the sun gear of the first planetary gear set. By the shifting element, the sun gear of the first planetary gear set is selectively connectable to the drive source selectively connected. In such an embodiment, the drive shaft connecting the sun gear of the first planetary gear set and the drive source comprises two drive shaft sections, the sections being selectively connectable by a shifting element. Thereby, the drive source can be disconnected from the sun gear of the first planetary gear set and thus from the transmission arrangement, so that a transfer of energy can no longer take place between drive source and sun gear of the first planetary gear set. The shifting element connecting the drive shaft sections is preferably a clutch, which can operatively connect the sun gear of the first planetary gear set with the drive source.

According to an additional example embodiment of the axle drive arrangement featuring one of the transmission arrangements described in the preceding description, the drive source is an internal combustion engine. The internal combustion engine can be connected by its crankshaft (for example) to the drive shaft of the transmission arrangement.

According to an additional example embodiment of the axle drive arrangement featuring one of the transmission arrangements described in the preceding description, the drive source is an electric motor.

Thereby, the electric motor is preferably an internal rotor-type electric motor. An internal-rotor-type electric motor is defined by the arrangement of the electric motors rotor and stator relative to each other. The magnetic circuit component of the electric motor that rotates and actively participates in the supply of energy (the rotor) is enclosed by the magnetic circuit component of the electric motor that is stationary and actively participates in the supply of energy (the stator). The rotor of such an electric motor features a cylindrical recess. The inner diameter of the electric motor corresponds to the inner diameter of the rotor of the electric motor. Thus, the rotor of the electric motor encloses a cylindrical volume. The stator may be enclosed by a cooling jacket for cooling the electric motor.

Alternatively, the electric motor may be formed as an outside-rotor-type electric motor. An outside-rotor-type electric motor is defined by the arrangement of the electric motors rotor and stator relative to each other. The magnetic circuit component of the electric motor that rotates and actively participates in the supply of energy (the rotor) encloses the magnetic circuit component of the electric motor that is stationary and actively participates in the supply of energy (the stator). The stator of such an electric motor features a cylindrical recess. The inner diameter of the electric motor corresponds to the inner diameter of the stator of the electric motor. Thus, the stator of the electric motor encloses a cylindrical volume. The rotor may be enclosed by a cooling jacket for cooling the electric motor.

According to an additional example embodiment of the axle drive arrangement featuring one of the transmission arrangements described in the previous description, the drive shaft and the first output shaft are positioned within a cylindrical volume, the outer shell surface of which is limited by the inner shell surface of the electric motor, the diameter of which corresponds to the internal diameter of an electric motor component that is actively involved in the supply of energy. In the preferred case of an electric motor designed as an internal-rotor-type electric motor, the internal diameter of the rotor of the electric motor is the diameter of the outer shell surface of the cylindrical volume. In the case of an electric motor designed as an outside-rotor-type electric motor, the internal diameter of the stator of the electric motor is the diameter of the outer shell surface of the cylindrical volume.

According to an additional example embodiment of the axle drive arrangement featuring one of the transmission arrangements described in the preceding description, the electric motor is either an asynchronous induction motor or a permanent-magnet synchronous motor or a hybrid synchronous motor. Depending on the area of application and other parameters of the axle drive arrangement, the most suitable of such types of electric motors can be selected.

A permanent-magnet synchronous motor features a high power density and a high degree of efficiency in the low rotational speed range. An asynchronous induction motor features a high degree of robustness, a good temperature resistance and a high degree of efficiency in the high rotational speed range. In addition, the asynchronous induction motor is inexpensive to manufacture. A hybrid synchronous motor features a high degree of efficiency both at low rotational speed and at high rotational speed and constant power.

According to an additional example embodiment of the axle drive arrangement featuring one of the transmission arrangements described in the preceding description, the electric motor can be operated either as a motor or as a generator. For driving the motor vehicle, the electric motor is operated as a motor; that is, as a drive source. That is, the electric motor provides energy, which is transferred through the drive shaft to the planetary gear sets and the differential and to the output shafts, and is used to propel the vehicle. In the case of braking operations, for example, the electric motor can be operated as a generator, and the energy provided by the braking process can be recuperated. Thereby, the energy is transferred to the electric motor through the drive shaft, the differential and the planetary gear sets by the drive shaft. This recuperates the energy and feeds it to an energy storage device, for example to an accumulator in which the energy is stored.

BRIEF DESCRIPTION OF THE DRAWINGS

On the basis of the figures described below, various embodiments and details of the invention are more specifically described. The following is shown.

DETAILED DESCRIPTION

Figure 1:
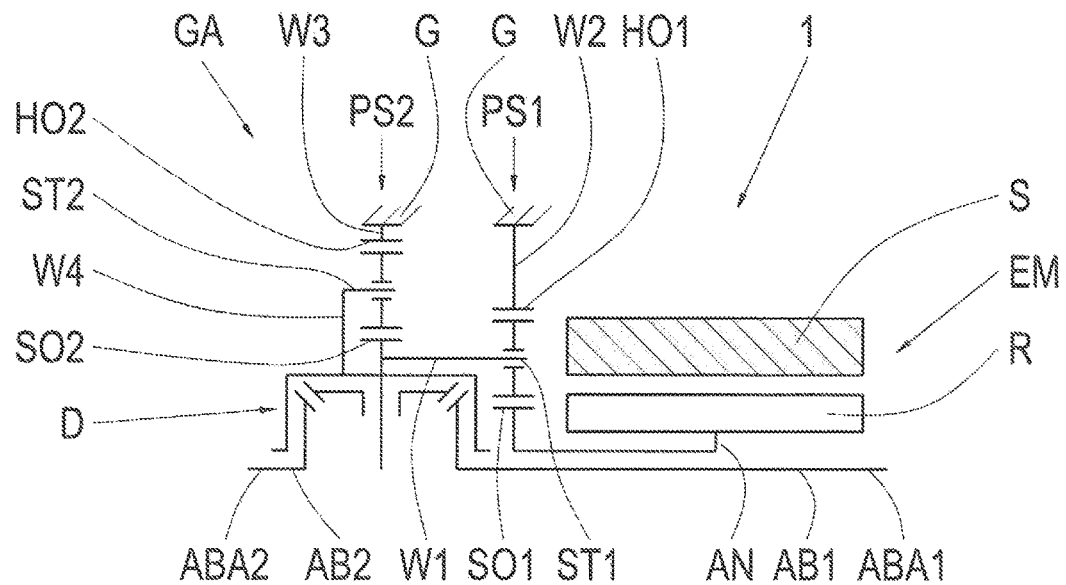
FIG. 1 a schematic of an axle drive arrangement with a transmission arrangement according to a first example embodiment, FIG. 2 a bearing layout of the axle drive arrangement with the transmission arrangement of the example embodiment shown in FIG. 1, FIG. 3 a schematic sectional view of the axle drive arrangement with the transmission arrangement shown in FIG. 1, FIG. 4 a schematic sectional view of a two-element bevel gear differential of a transmission arrangement according to an additional example embodiment, FIG. 5 a top view of the closed two-element bevel gear differential of the transmission arrangement according to the example embodiment shown in FIG. 4, and FIG. 6 a top view of the open two-element bevel gear differential of the transmission arrangement according to the example embodiment shown in FIG. 4.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In the following, the directional designation "axial" denotes a direction that is along an axis of rotation of a drive shaft, and thus along a center axis of the axle drive arrangement. The directional designation "radial" denotes a direction that is radial to an axis of rotation of a drive shaft, and thus radial to a center axis of the axle drive arrangement.

FIG. 1 shows a schematic of an axle drive arrangement 1 with a transmission arrangement GA according to a first embodiment. An electric motor EM, which is formed as an internal-rotor-type electric motor, features a rotor R and a stator S enclosing the rotor R. The rotor R of the electric motor EM is connected through a drive shaft AN to a sun gear SO1 of a first planetary gear set PS1 of the transmission arrangement GA. The first planetary gear set PS1 also features a planetary carrier ST1 and a ring gear HO1. The sun gear SO1 of the first planetary gear set PS1 meshes with planetary gears that are supported by the planetary carrier ST1 of the first planetary gear set PS1. Such planetary gears, in turn, mesh with the ring gear HO1 of the first planetary gear set PS1. The planetary carrier ST1 of the first planetary gear set PS1 is connected by a first shaft W1 to a sun gear SO2 of a second planetary gear set PS2 of the transmission arrangement GA. The ring gear HO1 of the first planetary gear set PS1 is connected through a second shaft W2 to a housing G of the axle drive arrangement 1 in a torque-proof manner.

The sun gear SO2 of the second planetary gear set PS2 meshes with planetary gears that are supported by a planetary carrier ST2 of the second planetary gear set PS2. These planetary gears mesh with a ring gear HO2 of the second planetary gear set PS2, whereas this ring gear HO2 is connected by a third shaft W3 to the housing G of the axle drive arrangement 1 in a torque-proof manner. The planetary carrier ST2 of the second planetary gear set PS2 is connected to a differential D by a fourth shaft W4. The differential D is also connected to a first drive shaft AB1 and a second drive shaft AB2. The transmission arrangement thus comprises the two planetary gear sets PS1, PS2, the differential D, the drive shaft AN, the first output shaft AB1, the second output shaft AB2 and the four additional shafts W1, W2, W3, W4.

Power provided by the electric motor EM is transferred through the drive shaft AN to the sun gear SO1 of the first planetary gear set PS1. This power is transferred through the first planetary gear set PS1 and the second planetary gear set PS2 to the differential D by the fourth shaft W4. From the fourth shaft W4, the power is transferred to the two output shafts AB1, AB2.

The electric motor EM of the axle drive arrangement 1 is positioned in an axial manner closest to an output shaft connection interface ABA1 of the first output shaft AB1. The differential D of the transmission arrangement GA of the axle drive arrangement 1 is arranged closest to an output shaft connection interface ABA2 of the second output shaft AB2. The drive shaft AN is coaxial with the first output shaft AB1 and partly encloses the first output shaft AB1. The drive shaft AN is also coaxial with the second output shaft AB2. The drive shaft AN and the first output shaft AB1 are also coaxial with the axis of rotation of the rotor R of the electric motor EM. Thus, the axle drive arrangement 1 represents a coaxial axle drive arrangement.

The second planetary gear set PS2 is arranged in an axial manner in the same plane as the differential D, e.g., such that the second planetary gear set PS2 is coplanar with the differential D in a plane that is perpendicular to the axial direction. The second planetary gear set PS2 is located at a radial distance from the center axis of the axle drive arrangement 1, whereas the differential is positioned on such center axis of the axle drive arrangement 1. In other words, the sun gear SO2 of the second planetary gear set PS2 partly encloses the differential D, since the differential D features a larger axial dimension than the sun gear SO2 of the second planetary gear set PS2. The first planetary gear set PS1 is arranged between the electric motor EM and the differential D. All structural elements of the axle drive arrangement 1 are arranged around the coaxial axes of rotation of the drive shaft AN and the two output shafts AB1, AB2. The structural elements of the axle drive arrangement 1 include, for example, the electric motor EM, the first planetary gear set PS1 with the sun gear SO1, the planetary carrier ST1 and the ring gear HO1, the second planetary gear set PS2 with the sun gear SO2, the planetary carrier ST2 and the ring gear HO2, the differential D, the drive shaft AN, the two output shafts AB1, AB2, the first shaft W1, the second shaft W2, the third shaft W3 and the fourth shaft W4, along with the housing G.

Figure 2:
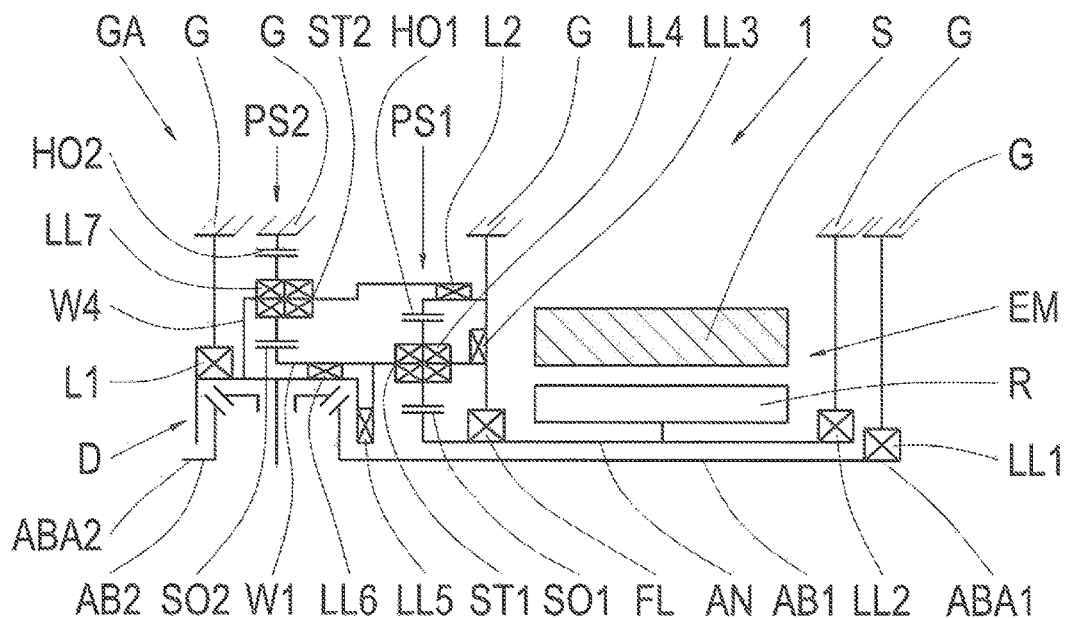

FIG. 2 shows a bearing layout of the axle drive arrangement 1 featuring the transmission arrangement GA of the embodiment shown in FIG. 1. FIG. 2 shows only one example of a possible bearing layout for the axle drive arrangement 1, this bearing layout enabling a transmission arrangement which makes the best use of the available installation space. The drive shaft AN is supported by a fixed-floating bearing system. Thereby, the floating bearing LL2 of the drive shaft AN is, for example, a grooved ball bearing, and is arranged on a circumferential surface of the drive shaft AN between the drive shaft AN and the housing G. Thereby, the fixed bearing FL of the drive shaft AN is, for example, a grooved ball bearing, and is arranged on the circumferential surface of the drive shaft AN between the drive shaft AN and the housing G.

The first output shaft AB1 is supported by a fixed-floating bearing system. Thereby, a floating bearing LL1 of the first output shaft AB1 is, for example, a grooved ball bearing, and is arranged on a circumferential surface of the first output shaft AB1 between the first output shaft AB1 and the housing G. The fixed bearing of the first output shaft AB1 is formed by the differential D. The planetary carrier ST1 of the first planetary gear set PS1 is supported by two (for example) axial needle bearings LL3, LL5, and by one (for example) needle bearing LL6. These three bearings LL3, LL5, LL6 of the planetary carrier ST1 of the first planetary gear set PS1 constitute floating bearings. The first bearing LL3 of the planetary carrier ST1 of the first planetary gear set PS1 is connected to the planetary carrier ST1 of the first planetary gear set PS1 and the housing G. The second floating bearing LL5 of the planetary carrier ST1 of the first planetary gear set PS1 is connected to the planetary carrier ST1 of the first planetary gear set PS1 and the differential D. The third floating bearing LL6 of the planetary carrier ST1 of the first planetary gear set PS1 is connected to the planetary carrier ST1 of the first planetary gear set PS1 and the differential D and, by the planetary carrier, to the sun gear SO2 of the second planetary gear set PS2.

The planetary gears carried by the planetary carrier ST1 of the first planetary gear set PS1 are supported by a bearing assembly LL4 consisting of floating bearings, for example needle bearings. Normally, two floating bearings are installed as a pair. The bearing assembly LL4 of floating bearings of the planetary carrier ST1 of the first planetary gear set PS1 is connected directly to the planetary gears supported by the planetary carrier ST1 of the first planetary gear set PS1, and thus directly adjoins them. The planetary gears, which carry the planetary carrier ST2 of the second planetary gear set PS2, are supported by a bearing assembly LL7 of floating bearings, for example needle bearings. The bearing assembly LL7 of floating bearings of the planetary carrier ST2 of the second planetary gear set PS2 is connected directly to the planetary gears supported by the planetary carrier ST2 of the second planetary gear set PS2, and thus directly adjoins them.

The differential D is supported by a fixed-floating bearing system. The fixed bearing L1 of the differential D is for example a grooved ball bearing. The fixed bearing L1 is arranged on a circumferential surface of the differential D arranged in a radial manner to an axis of rotation of the drive shaft AN. The fixed bearing L1 of the differential D is directly connected to the differential D and the housing G. At the same time, the floating bearing L2 of the differential D is the floating bearing L2 of the planetary carrier ST2 of the second planetary gear set PS2. The floating bearing L2 is for example a needle bearing. The floating bearing L2 of the differential D is connected to the planetary carrier ST2 of the second planetary gear set PS2 and the housing G.

Figure 3:
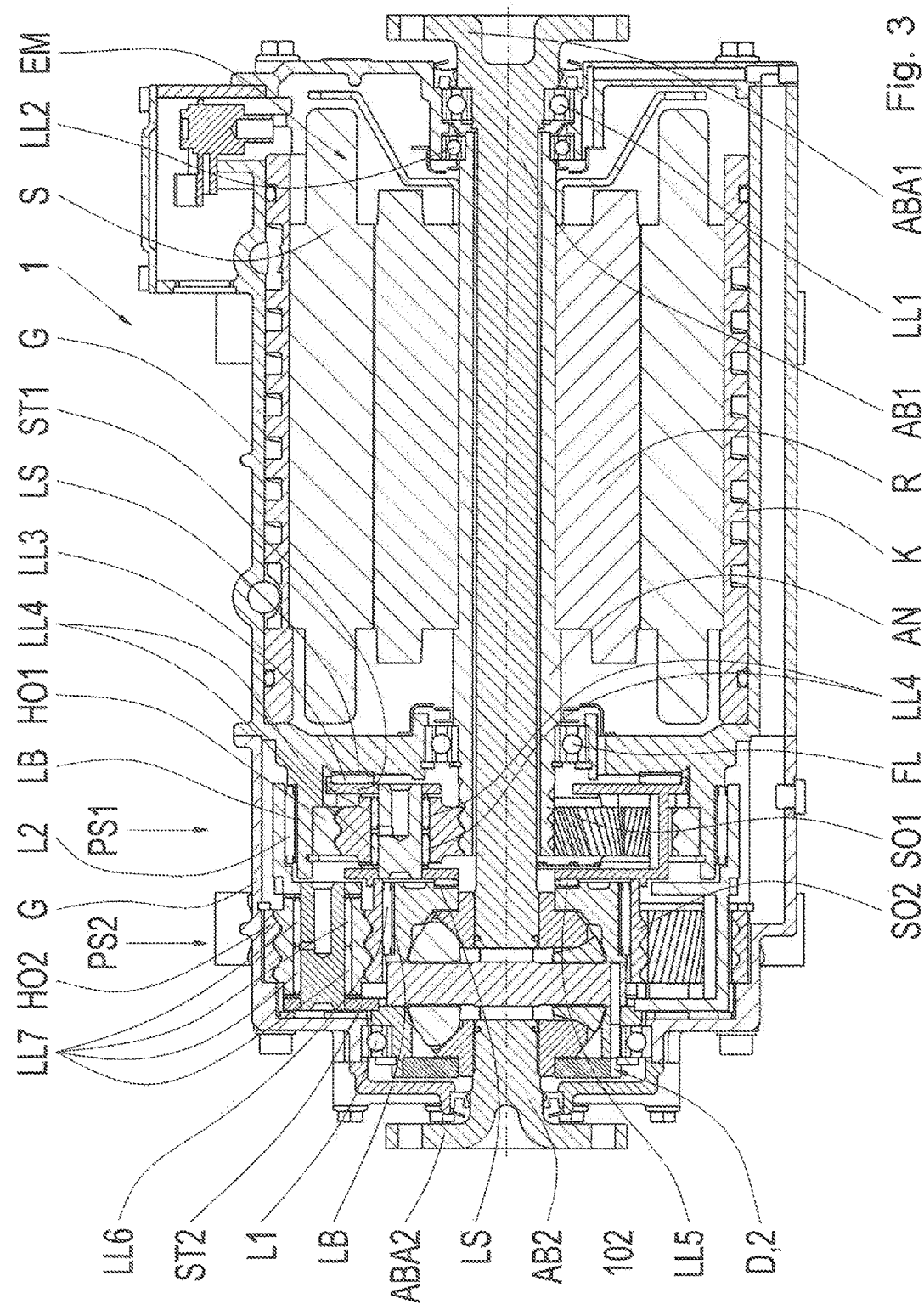

FIG. 3 shows a schematic sectional view of the axle drive arrangement with the transmission arrangement shown in FIG. 1. In this illustration, the exact arrangement of the structural elements of the axle drive arrangement 1 and thus of the transmission arrangement and the bearings can be seen. The interconnection of the individual structural elements with each other and their bearing layout is described in FIGS. 1 and 2. The housing G almost completely encloses the axle drive arrangement 1. The output shaft connection interface ABA1 of the first output shaft AB1 and the output shaft connection interface ABA2 of the second output shaft AB2 protrude from the housing G. The electric motor EM, which comprises the rotor R and the stator S, partly encloses the drive shaft AN in one section, and is directly connected to the drive shaft AN by the rotor R. In other words, the drive shaft AN is fitted in the rotor R of the electric motor EM in such section. On the side of the output shaft connection interface ABA1 of the first output shaft AB1, the drive shaft AN protrudes from the rotor R of the electric motor EM, so that it can be supported. From the sides of the output shaft connection interface ABA2 of the second output shaft AB2, the drive shaft AN protrudes from the rotor R of the electric motor EM, so that it can establish an operative connection to the first planetary gear set PS1. The stator S of the electric motor EM encloses the rotor R of the electric motor EM. The stator S of the electric motor EM is in turn enclosed by a cooling jacket K. The drive shaft AN is formed as a hollow shaft and almost completely encloses the first output shaft AB1. The output shaft connection interface ABA1 of the first output shaft AB1 is not enclosed by the drive shaft AN.

On the side of the output shaft connection interface ABA1 of the first output shaft AB1, the first output shaft AB1 is supported by the floating bearing LL1. The floating bearing LL1 of the first output shaft AB1 is positioned on the circumferential surface of the first output shaft AB1. The circumferential surface is arranged in a radial manner to the center axis, represented by a dashed line, of the axle drive arrangement 1, near the output shaft connection interface ABA1 of the first output shaft AB1. The floating bearing LL2, which supports the drive shaft AN, is positioned on the floating bearing LL1 of the first output shaft AB1 in the direction of the output shaft connection interface ABA2 of the second output shaft AB2. The floating bearing LL2 of the drive shaft AN is located in a radial manner further from the center axis than the floating bearing LL1 of the first output shaft AB1. The floating bearing LL2 is positioned in an axial manner closer to the electric motor EM than the floating bearing LL1 of the first output shaft AB1. The floating bearing LL2 is positioned on the circumferential surface of the drive shaft AN, which is arranged in a radial manner to the center axis of the axle drive arrangement 1.

In the axial direction of the output shaft connection interface ABA2, the fixed bearing FL of the drive shaft AN is arranged offset and adjacent the electric motor EM. The fixed bearing FL of the drive shaft AN is positioned on the circumferential surface of the drive shaft AN arranged in a radial manner to the center axis of the axle drive arrangement 1. The fixed bearing FL is located in a radial manner further from the center axis of the axle drive arrangement 1 than the floating bearing LL2 of the drive shaft AN. The sun gear SO1 of the first planetary gear set PS1 is mounted directly on the drive shaft AN; that is, the sun gear SO1 of the first planetary gear set PS1 and the drive shaft AN form a one-piece component, which cannot be separated without destruction. The sun gear SO1 of the first planetary gear set PS1 limits the drive shaft AN on the side of the output shaft connection interface ABA2 of the second output shaft AB2.

The first floating bearing LL3, which supports the planetary carrier ST1 of the first planetary gear set PS1, is connected to a bearing plate LS and adjoins the bearing plate LS. The first floating bearing LL3 of the planetary carrier ST1 of the first planetary gear set PS1 is arranged in an axial manner closer to the output shaft connection area ABA2 of the second output shaft AB2 than the fixed bearing FL of the drive shaft AN, and in a radial manner further from the center axis of the axle drive arrangement 1 than the fixed bearing FL of the drive shaft AN. Thereby, the bearing plate LS of the first floating bearing LL3 of the planetary carrier ST1 of the first planetary gear set PS1 is arranged closer to the output shaft connection interface ABA1 of the first output shaft AB1 than the first floating bearing LL3 of the planetary carrier ST1 of the first planetary gear set PS1, but is also in a radial manner as far away from the center axis as the first floating bearing LL3 of the planetary carrier ST1 of the first planetary gear set PS1. The bearing plate LS of the first floating bearing LL3 of the planetary carrier ST1 of the first planetary gear set PS1 in an axial manner adjoins the housing G in the direction of the output shaft connection interface ABA1 of the first output shaft AB1.

The first planetary gear set PS1 is arranged in a radial manner directly on the drive shaft AN, and is arranged in an axial manner closer to the output shaft connection interface ABA2 of the second output shaft AB2 than the first floating bearing LL3 of the planetary carrier ST1 of the first planetary gear set PS1. The floating bearing packet LL4 of the first planetary gear set PS1 is arranged within the first planetary gear set PS1, since the planetary gears of the first planetary gear set PS1 are thus supported. The floating bearing L2 of the differential D is arranged in an axial manner in the same plane as the first planetary gear set PS1 and in a radial manner between the ring gear HO1 of the first planetary gear set PS1 and the housing G; at the same time, it supports the planetary carrier ST2 of the second planetary gear set PS2. The floating bearing L2 of the differential D is connected to a bearing bush LB and adjoins the bearing bush LB. The bearing bush LB of the floating bearing L2 of the differential D is arranged in a radial manner closer to the center axis of the axle drive arrangement 1 than the floating bearing L2 of the differential D, but is positioned in an axial manner in the same plane as the first planetary gear set PS1, and thus as the floating bearing L2 of the differential D.

The second floating bearing LL5 of the planetary carrier ST1 of the first planetary gear set PS1 adjoins the first planetary gear set PS1, and is arranged in an axial manner closer to the output shaft connection interface ABA2 of the second output shaft AB2 than the first planetary gear set PS1. In a radial manner, the second floating bearing LL5 of the planetary carrier ST1 of the first planetary gear set PS1 is as far away from the center axis of the axle drive arrangement 1 as the fixed bearing FL of the drive shaft AN. The second floating bearing LL5 of the planetary carrier ST1 of the first planetary gear set PS1 is connected to a bearing plate LS and adjoins it. The bearing plate LS is arranged closer to the output shaft connection interface ABA2 of the second output shaft AB2 than the second floating bearing LL5 of the planetary carrier ST1 of the first planetary gear set PS1. The bearing plate LS of the second floating bearing LL5 of the planetary carrier ST1 of the first planetary gear set PS1 adjoins the differential D in an axial manner in the direction of the output shaft connection interface ABA2 of the second output shaft AB2.

Figure 4:
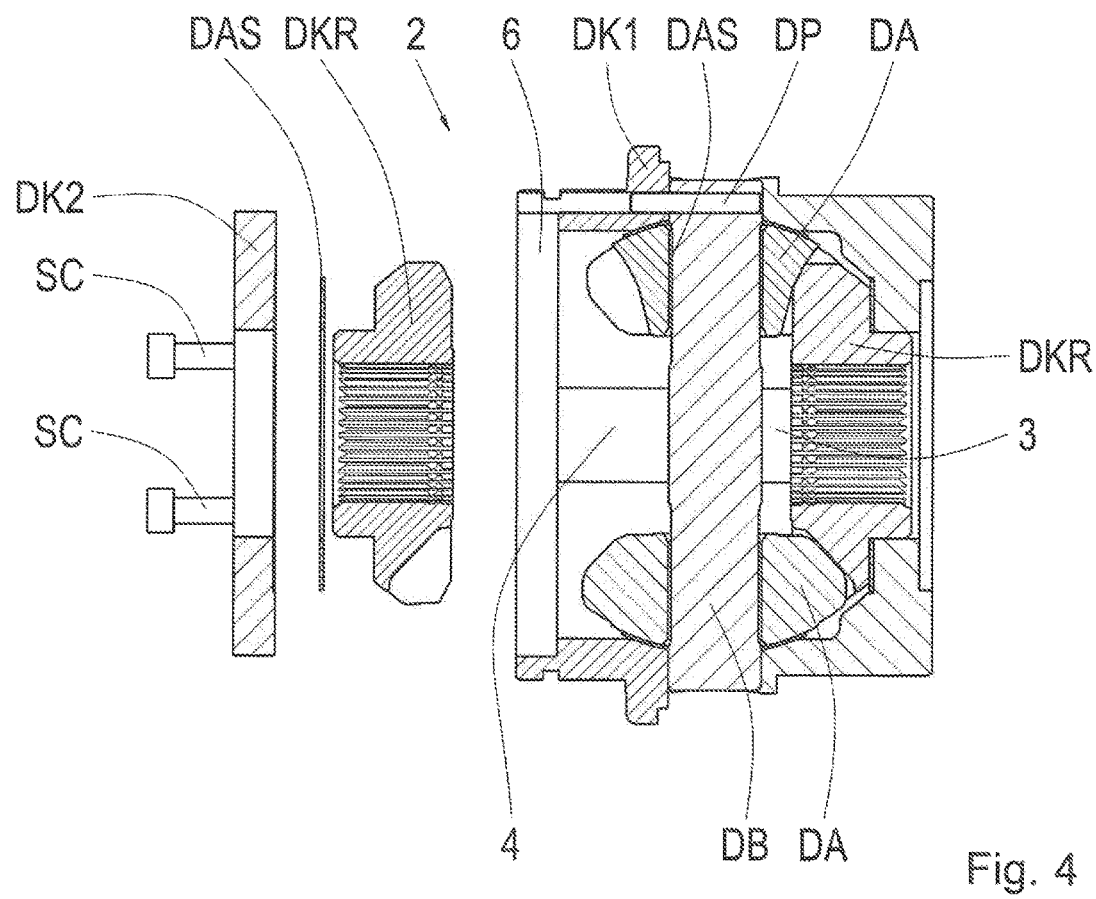

The differential D is a two-element bevel gear differential 2 shown in FIG. 4. The differential D is arranged in an axial manner closer to the output shaft connection interface ABA2 of the second output shaft AB2 than the bearing plate LS of the second floating bearing LL5 of the planetary carrier ST1 of the first planetary gear set PS1, and is positioned in a radial manner on the center axis of the axle drive arrangement 1. The differential D guides both the first output shaft AB1 and the second output shaft AB2.

The third floating bearing LL6 of the planetary carrier ST1 of the first planetary gear set PS1 is connected to a bearing bush LB and adjoins the bearing bush LB. The bearing bush LB of the third floating bearing LL6 of the planetary carrier ST1 of the first planetary gear set PS1 is arranged on a circumferential surface of the differential D, the circumferential surface being arranged in a radial manner to the center axis of the axle drive arrangement 1. The third floating bearing LL6 of the planetary carrier ST1 of the first planetary gear set PS1 and the associated bearing bush LB are arranged in an axial manner closer to the output shaft connection interface ABA2 of the second output shaft AB2 than the second floating bearing LL5 of the planetary carrier ST1 of the first planetary gear set PS1. In a radial manner, the third floating bearing LL6 of the planetary carrier ST1 of the first planetary gear set PS1 is further from the center axis of the axle drive arrangement 1 than the bearing bush LB of the third floating bearing LL6 of the planetary carrier ST1 of the first planetary gear set PS1.

The sun gear SO2 of the second planetary gear set PS2 adjoins the third floating bearing LL6 of the planetary carrier ST1 of the first planetary gear set PS1 in the radial direction. The sun gear SO2 of the second planetary gear set PS2, and thus the entire second planetary gear set PS2, is, in a radial manner, further from the center axis of the axle drive arrangement 1 than the third floating bearing LL6 of the planetary carrier ST1 of the first planetary gear set PS1. In an axial manner, the second planetary gear set PS2 is arranged closer to the output shaft connection interface ABA2 of the second output shaft AB2 than the second floating bearing LL5 of the planetary carrier ST1 of the first planetary gear set PS1. The floating bearing assembly LL7 of the second planetary gear set PS2 is arranged within the second planetary gear set PS2, since the planetary gears of the second planetary gear set PS2 are thus supported.

The fixed bearing L1 of the differential D is arranged in an axial manner closer to the output shaft connection interface ABA2 of the second output shaft AB2 than the second planetary gear set PS2. The fixed bearing L1 of the differential D in a radial manner directly adjoins the differential D, is connected to the differential D and is positioned further from the center axis of the axle drive arrangement 1 than the differential D.

FIG. 4 shows a schematic sectional view of a two-element bevel gear differential 2 of a transmission arrangement according to an additional example embodiment. The illustrated exemplary two-element bevel gear differential 2 features a two-part differential cage, which in turn features a first differential cage element DK1 and a second differential cage element DK2, two bevel gears DKR, two compensating wheels DA, one alignment pin DP, one differential bolt DB, two thrust washers DAS along with four screws SC, whereas only two screws SC are shown on the basis of the sectional view. In addition, the two-element bevel gear differential 2 features a guide 3 for the first output shaft AB1 and a guide 4 for the second output shaft AB2. The first differential cage element DK1 has a cup-shaped design, and features a recess 6 that is suitable in shape and size for receiving the second differential cage element DK2. The second differential cage element DK2 is designed as a cover, which can be bolted to the first differential cage element DK1.

The two-element bevel gear differential 2 is assembled in the axial direction along the center axis, which is shown as a dash-dot line. In highly simplified terms, the assembly proceeds as follows: first, a first bevel gear DKR is introduced into the first differential cage element DK1, then the two compensating wheels DA, which are fixed to the differential bolt DB, are introduced together with one of the thrust washers DAS, which is arranged between the differential bolts DB and the compensating wheels DA. The differential bolt DB is connected to the first differential cage DK1 by the alignment pin DP. Subsequently, the second bevel gear DKR and the second thrust washer DAS are introduced into the first differential cage element DK1. Finally, the second differential cage element DK2 is inserted into the recess 6 provided for this purpose in the first differential cage element DK1, and is bolted to the first differential cage element DK1 with the screws SC. The screws SC are designed to withstand the axial forces of the two element differential 2 during operation. The operation of the two-element bevel gear differential 2 is that of a conventional bevel gear differential.

Figure 5:
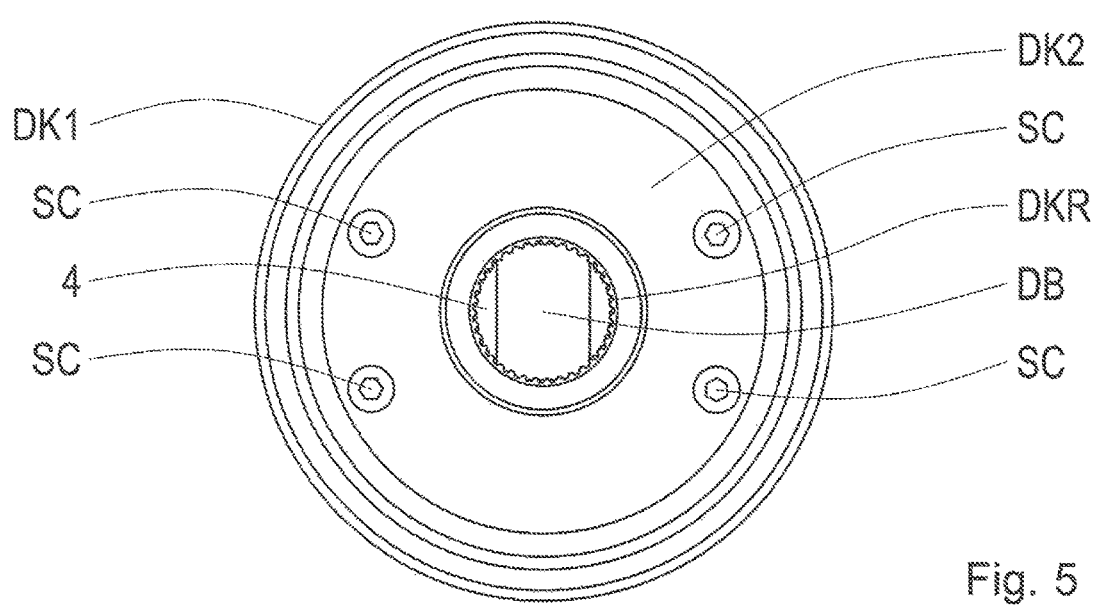

FIG. 5 shows a top view of the closed two-element bevel gear differential 2 of the transmission arrangement according to the example embodiment shown in FIG. 4. The viewing direction of the illustrated two-element bevel gear differential 2 is from the side of the second differential cage element DK2. The second differential cage element DK2 is bolted to the first differential cage element DK1 by the four screws SC. The differential bolt DB and the fit of one of the bevel gears DKR for the second output shaft are shown through the guide 4 for the second output shaft AB2.

Figure 6:
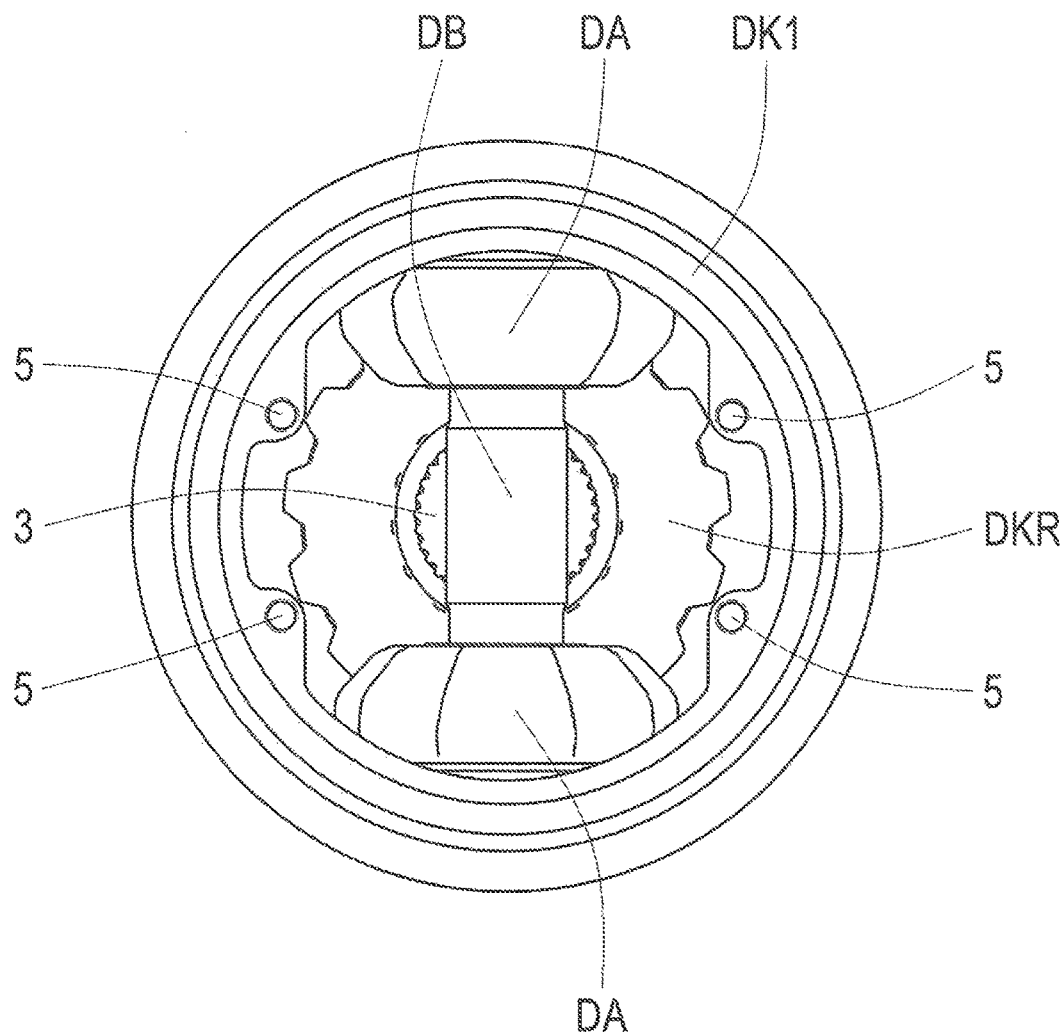

FIG. 6 shows a top view of the open two-element bevel gear differential 2 of the transmission arrangement according to the example embodiment shown in FIG. 4. The viewing direction of the illustrated two-element bevel gear differential 2 is from the side of the second differential cage element DK2, whereas the second differential cage element DK2 is removed. Within the first differential cage element DK1, a bevel gear DKR is arranged behind the two compensating wheels DA and behind the differential bolt DB positioned at a center point of the compensating wheels DA.

The first bevel gear DKR features the guide 3 for the first output shaft AB1. The second bevel gear is removed and not shown. The first differential cage element DK1 features four screw recesses 5 that serve the purpose of receiving the screws, so that the second differential cage element DK2 can be fixed on the first differential cage element DK1.

The embodiments shown here are only selected as examples. For example, interconnection possibilities of the two planetary gear sets can be realized by shifting elements, in order to obtain a different number and different gear ratio steps. Furthermore, instead of the electric motor, an internal combustion engine can be connected to the transmission arrangement. The connection between the drive source (that is, an electric motor or an internal combustion engine) and the transmission arrangement by the drive shaft can be interrupted by a shifting element (such as a clutch).

Modifications and variations can be made to the embodiments illustrated or described herein without departing from the scope and spirit of the invention as set forth in the appended claims.

REFERENCE SIGNS

1 Axle drive arrangement
2 Two-element bevel gear differential
3 Guide of the first output shaft
4 Guide of the second output shaft
5 Screw recess
6 Recess
AB1 First output shaft
AB2 Second output shaft
ABA1 Output shaft connection interface of the first output shaft
ABA2 Output shaft connection interface of the second output shaft
AN Drive shaft
D Differential
DA Compensating wheel
DAS Thrust washer
DB Differential bolt
DK1 First differential cage element
DK2 Second differential cage element
DKR Bevel gear
DP Alignment pin
EM Electric motor
FL Fixed bearing of the drive shaft
G Housing
GA Transmission arrangement
HO1 Ring gear of the first planetary gear set
HO2 Ring gear of the second planetary gear set
K Cooling jacket
L1 Fixed bearing of the differential
L2 Floating bearing of the differential
LL1 Floating bearing of the first output shaft
LL2 Floating bearing of the drive shaft
LL3 First floating bearing of the carrier of the first planetary gear set
LL4 Bearing assembly of floating bearings of the first planetary gear set
LL5 Second floating bearing of the carrier of the first planetary gear set
LL6 Third floating bearing of the carrier of the first planetary gear set
LL7 Bearing assembly of floating bearings of the second planetary gear set
PS1 First planetary gear set
PS2 Second planetary gear set R Rotor
S Stator
SC Screw
SO1 Sun gear of the first planetary gear set
SO2 Sun gear of the second planetary gear set
ST1 Planetary carrier of the first planetary gear set
ST2 Planetary carrier of the second planetary gear set
W1 First shaft
W2 Second shaft
W3 Third shaft
W4 Fourth shaft

The invention claimed is:

1. A transmission (GA) for an axle drive (1) of a motor vehicle, comprising:
   a drive shaft (AN);
   two output shafts (AB1, AB2);
   at least four shafts (W1, W2, W3, W4);
   a differential; and
   two interconnected planetary gear sets (PS1, PS2), the first planetary gear set (PS1) comprising a sun gear (SO1), a planetary carrier (ST1) and a ring gear (HO1), the second planetary gear set (PS2) also comprising a sun gear (SO2), a planetary carrier (ST2) and a ring gear (HO2),
   wherein the drive shaft (AN) is a hollow shaft, the drive shaft (AN) positioned coaxial with at least one of the two output shafts (AB1, AB2),
   wherein the differential (D) is arranged, at least partly, within a cylindrical volume, an outer shell surface of the cylindrical volume defined by an inner shell surface of the sun gear (SO2) of the second planetary gear set (PS2), a diameter of inner shell surface corresponding to an inner diameter of the sun gear (SO2) of the second planetary gear set (PS2), and
   wherein the ring gear (HO1) of the first planetary gear set (PS1) is non-rotatably fixed by a second shaft (W2) of the at least four shafts (W1, W2, W3, W4), and the ring gear (HO2) of the second planetary gear set (PS2) is non-rotatably fixed by a third shaft (W3) of the at least four shafts (W1, W2, W3, W4).

2. The transmission of claim 1, wherein the planetary carrier (ST1) of the first planetary gear set (PS1) is in operative connection with the sun gear (SO2) of the second planetary gear set (PS2) by a first shaft (W1) of the at least four shafts (W1, W2, W3, W4).

3. The transmission of claim 1, wherein the planetary carrier (ST2) of the second planetary gear set (PS2) is in operative connection with the differential (D) by a fourth shaft (W4) of the at least four shafts (W1, W2, W3, W4).

4. The transmission of claim 1, wherein the differential (D) is a two-element bevel gear differential (2), a differential cage of the two-element bevel gear differential (2) comprising a first differential cage element (DK1) and a second differential cage element (DK2), the second differential cage element (DK2) connectable to the first differential cage element (DK1), the two-element bevel gear differential (2) positioned coaxial with the drive shaft (AN) on an axis of rotation of the drive shaft (AN).

5. The transmission of claim 4, wherein the differential (D) is supported by a fixed-floating bearing layout through a fixed bearing (L1) and a floating bearing (L2).

6. The transmission of claim 5, wherein the fixed bearing (L1) is arranged on the first differential cage element (DK1) between a housing (G) that substantially encloses the axle drive (1) and the first differential cage element (DK1), the floating bearing (L2) guided on the housing (G) by the planetary carrier (ST2) of the second planetary gear set (PS2).

7. An axle drive (1) for a motor vehicle, comprising the transmission (GA) of claim 1, wherein the transmission (GA) is in operative connection with a drive source.

8. The axle drive (1) of claim 7, wherein the drive shaft (AN) connects the sun gear (SO1) of the first planetary gear set (PS1) with the drive source.

9. The axle drive (1) of claim 7, wherein a shifting element is arranged between the drive source and the sun gear (SO1) of the first planetary gear set (PS1) such that the sun gear (SO1) of the first planetary gear set (PS1) and the drive source are selectively connectable with the shifting element.

10. The axle drive (1) of claim 7, wherein the drive source is an internal combustion engine.

11. The axle drive (1) of claim 7, wherein the drive source is an electric motor.

12. The axle drive (1) of claim 11, wherein the drive shaft (AN) and the first output shaft (AB1) are positioned within an additional cylindrical volume, an outer shell surface of the additional cylindrical volume defined by an inner shell surface of the electric motor (EM), a diameter of the inner shell surface of the electric motor (EM) corresponding to an internal diameter of a rotor or a stator of the electric motor (EM).

13. The axle drive (1) of claim 11, wherein the electric motor (EM) is formed as an asynchronous induction electric motor, as a permanent-magnet synchronous motor, or as a hybrid synchronous motor.

14. The axle drive (1) of claim 11, wherein the electric motor (EM) is selectively operable as either as a motor or as a generator.

* * * * *